US012728940B2

(12) United States Patent
Umbach et al.

(10) Patent No.: US 12,728,940 B2
(45) Date of Patent: Sep. 8, 2026

(54) IDLER WHEEL WITH TAPERED WEBBING

(71) Applicant: Caterpillar Inc., Peoria, IL (US)

(72) Inventors: Brian B. Umbach, Peoria, IL (US); Martin Tagore Joseph Xavier, Tamil Nadu (IN); Seiji Iijima, Akashi (JP)

(73) Assignee: Caterpillar Inc., Peoria, IL (US)

( * ) Notice: Subject to any disclaimer, the term of this patent is extended or adjusted under 35 U.S.C. 154(b) by 376 days.

(21) Appl. No.: 18/457,652

(22) Filed: Aug. 29, 2023

(65) Prior Publication Data

US 2025/0074521 A1 Mar. 6, 2025

(51) Int. Cl.
*B62D 55/14* (2006.01)

(52) U.S. Cl.
CPC .................................... *B62D 55/14* (2013.01)

(58) Field of Classification Search
CPC ...................................................... B62D 55/14
USPC ........................................................... 301/60
See application file for complete search history.

(56) References Cited

U.S. PATENT DOCUMENTS 3,127,212 A * 3/1964 Eklund ............... B60B 17/0006 295/21
3,771,843 A * 11/1973 Clasper .................. B21D 53/26 474/197
3,914,511 A * 10/1975 Vassiliades .......... B41M 5/1246 503/226
3,915,511 A 10/1975 Clasper et al.
8,770,677 B2 7/2014 Yelistratov
9,387,893 B2 7/2016 Steiner et al.
2010/0133898 A1* 6/2010 Johannsen ............. B62D 55/32 305/137
2012/0153714 A1* 6/2012 Yelistratov ........... B62D 55/145 474/190
2021/0114674 A1* 4/2021 Suanno ................. B60B 25/002

FOREIGN PATENT DOCUMENTS

CN 101500822 B * 11/2011 ......... B60B 17/0006
DE 159051 A3 * 3/1983
DE 10113362 10/2001
DE 10113362 A1 * 10/2001 ............. B62D 55/14
EP 1389539 A1 * 2/2004 ......... B60B 17/0068
JP H03504112 A * 9/1991
WO WO-2023126657 A1 * 7/2023 ............... B60B 3/02
WO 20230219857 11/2023

* cited by examiner

*Primary Examiner* — S. Joseph Morano
*Assistant Examiner* — Eva L Comino

(57) ABSTRACT

An idler wheel may include an annular rim portion, an annular hub portion configured to be positioned about an axle, a webbing extending from an outer surface of the hub portion to an inner surface of the rim portion, the webbing including a first radius portion converging with the inner surface of the rim portion, a second radius portion converging with the outer surface of the hub portion, a taper transition point, and a first tapered portion between the first radius portion and the taper transition point. The idler wheel may further include a second tapered portion between the second radius portion and the taper transition point.

20 Claims, 4 Drawing Sheets

IDLER WHEEL WITH TAPERED WEBBING

TECHNICAL FIELD

The present disclosure relates generally to an idler wheel for a mobile machine, and more particularly, to an idler wheel with a tapered webbing.

BACKGROUND

Track-type machines are used in a wide variety of rugged service environments. The use of ground engaging tracks rather than wheels can provide enhanced traction, stability, and robustness to a machine system over what might otherwise be available. Mining, construction, landfills, forestry, and still other service environments are notable examples of where track-type machines are advantageously used. A typical undercarriage system in a track-type machine may include a plurality of track shoes coupled together in an endless track chain by way of a set of track links, and extending about a drive sprocket and one or more rotatable idler wheels. An idler wheel in particular may experience dynamic loading during operation of a machine, which in turn may translate to stresses within the idler wheel. Suboptimal distribution of stresses within the idler wheel may promote failure and shorten its service life.

As an idler wheel may be standardized across different machines and therefore mass produced, it is critical that durability and robustness of the idler wheel be harmonized with manufacturing cost and component weight. A thick, solid idler wheel may be sufficiently durable and robust to allay any concerns of stress failure, but may also be of suboptimal weight and the cost of materials for such a wheel may be prohibitive. Accordingly, a need exists to optimize strength, durability, weight, and cost of the idler wheel.

An exemplary idler wheel is disclosed in U.S. Pat. No. 9,387,893 B2 ("the '893 patent") to Steiner et al. The '893 patent discloses an idler wheel having a flange connecting a hub portion and a rib portion. The flange is tapered only in a single direction—from the hub portion outwardly to the rim portion. The '893 patent further explains that the idler wheel disclosed therein includes multiple side plates attached thereto. Such a configuration, however, may not satisfactorily distribute stresses due to loading throughout the body of the idler wheel, and may inefficiently distribute weight about the idler wheel. The configuration shown in the '893 patent may therefore lead to premature failure, shortened service life, and/or increased material costs.

The idler wheel of the present disclosure may solve one or more of the problems set forth above and/or other problems in the art. The scope of the current disclosure, however, is defined by the attached claims, and not by the ability to solve any specific problem.

SUMMARY

In one aspect, an idler wheel may include an annular rim portion, an annular hub portion configured to be positioned about an axle, a webbing extending from an outer surface of the hub portion to an inner surface of the rim portion, the webbing including a first radius portion converging with the inner surface of the rim portion, a second radius portion converging with the outer surface of the hub portion, a taper transition point, and a first tapered portion between the first radius portion and the taper transition point. The first tapered portion may taper in thickness from an end of the first radius portion to the taper transition point. The idler wheel may further include a second tapered portion between the second radius portion and the taper transition point. The second tapered portion may taper in thickness from an end of the second radius portion to the taper transition point.

In another aspect, an idler wheel may include an annular rim portion, an annular hub portion configured to be positioned about an axle, a webbing extending from an outer surface of the hub portion to an inner surface of the rim portion, the webbing including a taper transition point between the outer surface of the hub portion and the inner surface of the rim portion, and a first tapered portion between the outer surface of the hub portion and the taper transition point. The first tapered portion may taper substantially linearly in thickness toward to the taper transition point. The idler wheel may further include a second tapered portion between the inner surface of the rim portion and the taper transition point. The second tapered portion may taper substantially linearly in thickness toward to the taper transition point.

In still another aspect, an idler wheel may include an annular rim portion, an annular hub portion configured to be positioned about an axle, a webbing extending from an outer surface of the hub portion to an inner surface of the rim portion, the webbing including a first radius portion converging with the inner surface of the rim portion, a second radius portion converging with the outer surface of the hub portion, a first tapered portion extending a first length from an end of the first radius portion and tapering in thickness along the first length, and a second tapered portion extending a second length from an end of the second radius portion and tapering in thickness along the second length.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about." "substantially," and "approximately" are used to indicate a possible variation of ±10% in the stated value.

Figure 1:
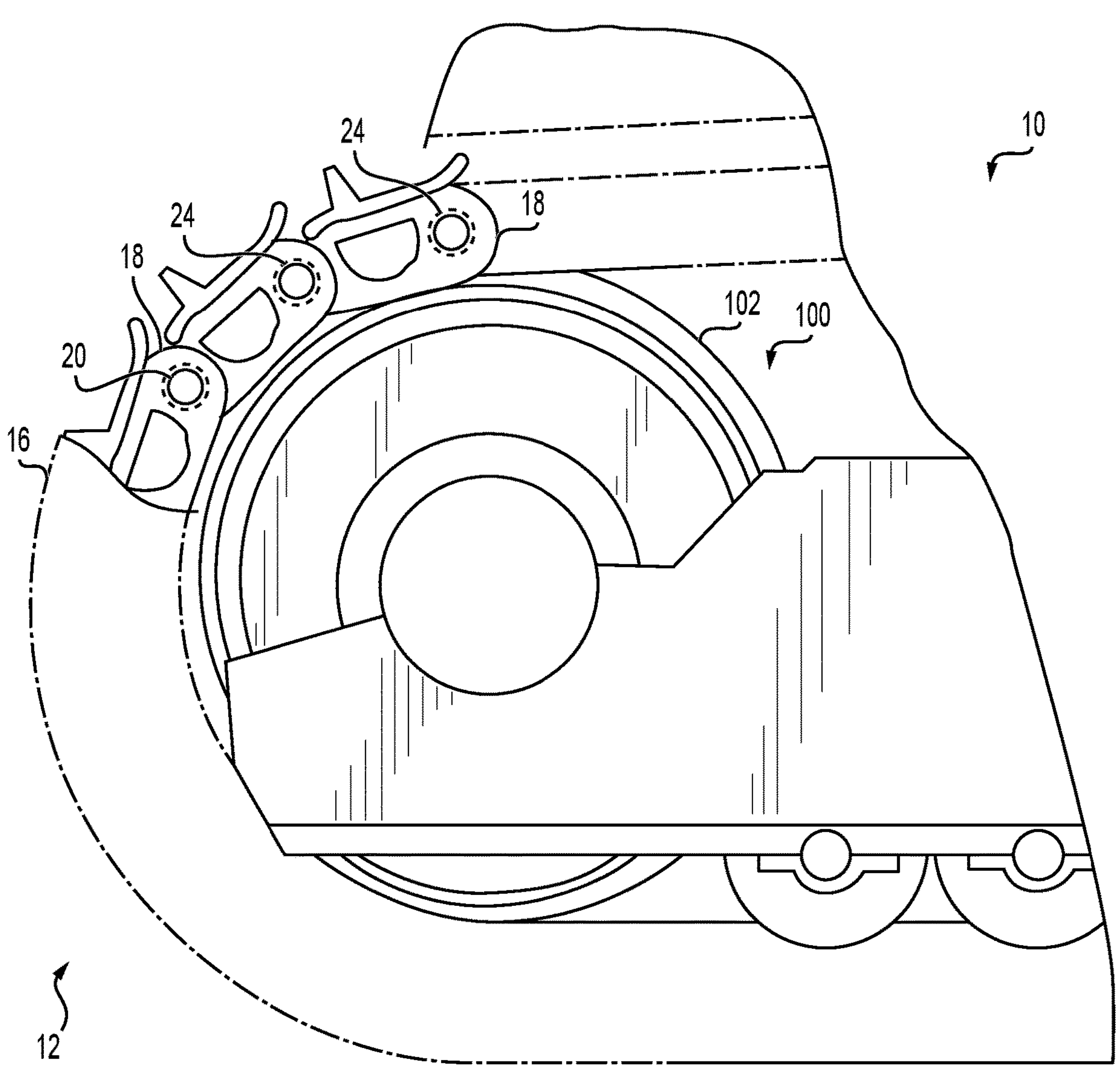
FIG. 1 illustrates a portion of machine having an idler wheel.

FIG. 1 is a partial view of a mobile machine 10, including a portion of a track assembly 12 associated with the mobile machine. Mobile machine 10 may be any of various mobile machines that employ track assemblies for ground transportation and/or for mobility during machine operation. For example, mobile machine 10 may be a track-type tractor, skid steer, dozer, excavator, track loader, front shovel, rope shovel, or any other type of track-maneuverable machine. Track assembly 12 may include an idler wheel 100 cooperating with track 16 of track assembly 12. While only a portion of track assembly 12 is illustrated in FIG. 1, it will be understood that, in addition to idler wheel 100, a drive sprocket (not shown) and one or more other idler wheels (also not shown), and other generally conventional track assembly components, may be associated with track assembly 12.

Track 16 may include a plurality of track links 18 connected by transverse track pins 20 and forming an endless loop about idler wheel 100, the drive sprocket, and any other idler wheels that may be associated with the track assembly. Idler wheel 100 may include an outer peripheral surface 102 configured to engage track links 18, although other configurations are possible, such as engagement with track bushings 24 that may be associated with track pins 20. During operation, the drive sprocket may be driven by a power source (e.g., an engine) to engage track links 18 (e.g., via track pins 20) and cause movement of the track. Track bushings 24 may similarly engage track pins 20 to guide the track as it moves around the loop.

Figures 2A, 2B:
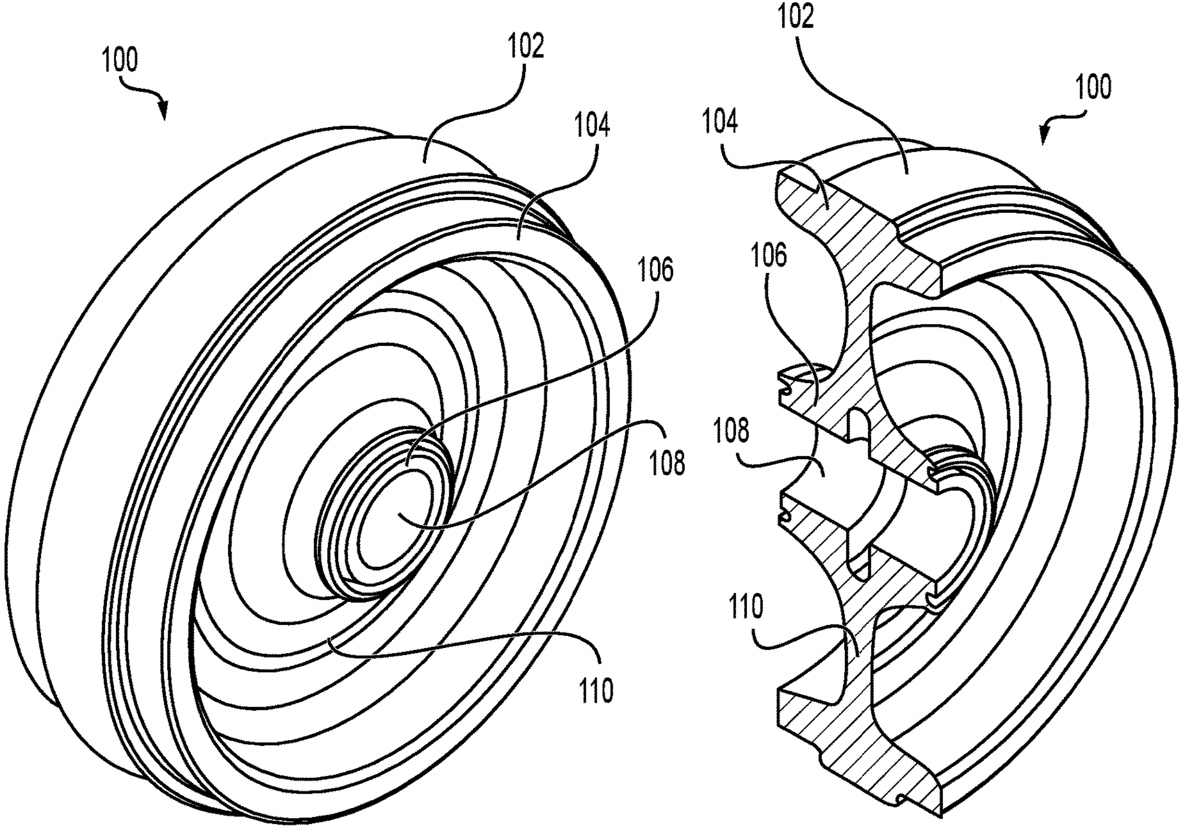
FIG. 2A is a perspective view of an exemplary idler wheel.
FIG. 2B is a perspective cross-sectional view of the exemplary idler wheel of FIG. 2A.

FIGS. 2A and 2B illustrate a perspective view and a cross-sectional perspective view, respectively, of idler wheel 100 in accordance with the present disclosure. Outer peripheral surface 102 may extend around an outer circumference of idler wheel 100 and may be contoured as desired for engagement with track 16 and/or track links 18. Idler wheel 100 may also include a rim portion 104 positioned radially inwardly of outer peripheral surface 102. Rim portion 104 may be generally annular in shape. Idler wheel 100 may further include a hub portion 106 positioned radially inwardly of rim portion 104. Hub portion 106 may be generally annular in shape and may define a center cavity 108. Hub portion 106 and/or center cavity 108 may be configured to be positioned about an axle (not pictured) for rotation.

Idler wheel 100 may further include a webbing 110. Webbing 110 may extend from hub portion 106 to rim portion 104, thereby providing structural support between rim portion 104 and hub portion 106. Webbing 110 may be integrally formed with rim portion 104 and/or hub portion 106. For example, idler wheel 100 may be cast from a single material, such as a high strength steel. The steel may be a high alloy steel, for example. In some embodiments, idler wheel 100 may be formed by forging, stamping, punching, or the like.

As shown in FIG. 2B, webbing 110 is narrower in an axial direction than rim portion 104 and hub portion 106. Webbing 110 may thereby serve to provide adequate support between rim portion 104 and hub portion 106 and stability to idler wheel 100, without unduly increasing the weight or material cost of idler wheel 100.

Figure 3:
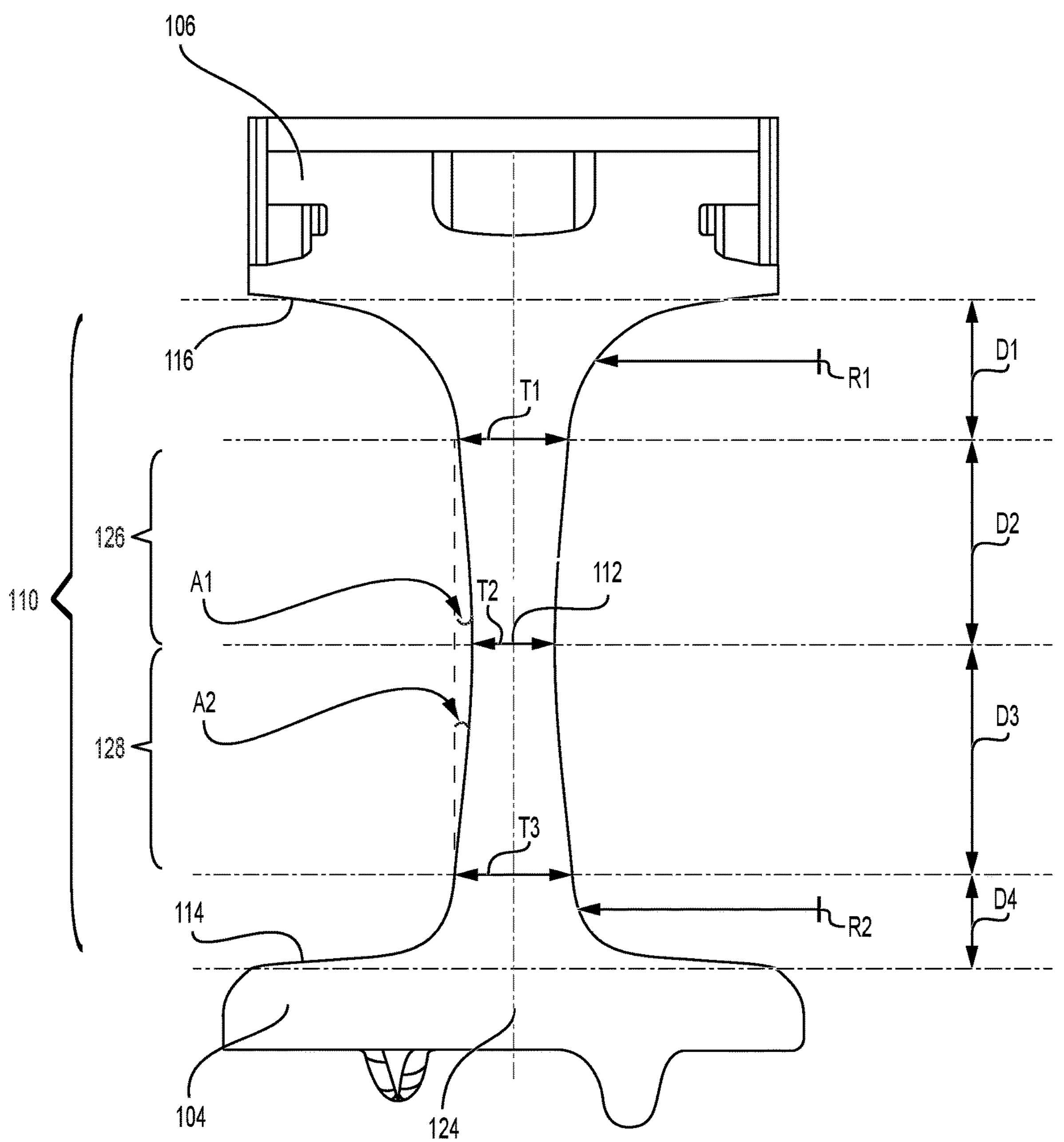
FIG. 3 is a partial cross-sectional view of the exemplary idler wheel of FIG. 2A.

FIG. 3 illustrates a partial cross-section of idler wheel 100 extending from rim portion 104 partially through hub portion 106 and depicting dimensions of idler wheel 100 in greater detail. As shown in FIG. 3, idler wheel 100 may be generally symmetrical about a central axis 124 bisecting webbing 110. Accordingly, where a feature or dimension is labeled on only one side of idler wheel 100 in FIG. 3, it will be understood that the corresponding description of that feature or dimension applies with equal effect to its symmetrical counterpart. Additionally, FIG. 3 depicts track engagement protrusions extending radially outwardly from rim portion 104, though it should be understood that such protrusions may be included or omitted as desired.

As shown, rim portion 104 may include an inner rim surface 114 facing approximately toward a center of idler wheel 100. Hub portion 106 may similarly include an inner hub surface 116 facing approximately away from a center of idler wheel 100. Inner hub surface 116 may gradually transition into webbing 110 such that a radius R1 is formed between inner hub surface 116 and webbing 110. Put another way, radius R1 may converge with inner hub surface 116. Similarly, inner rim surface 114 may gradually transition into webbing 110 such that a radius R2 is formed between inner rim surface 114 and webbing 110. Likewise, radius R2 may converge with inner rim surface 114.

In some embodiments, radius R1 may be between about 30 mm and 32 mm, or about 31 mm. In some embodiments, radius R2 may be between about 16 mm and about 18 mm, or about 17 mm.

Webbing 110 may feature bi-directional tapering in thickness. For example, as shown in FIG. 3, webbing 110 may include a thickness T1 at an end of radius R1. Webbing 110 may include a thickness T2 at a transition point 112 of webbing 110. Webbing 110 may further include a thickness T3 at an end of radius R2. Webbing 110 may taper in two directions: from the end of radius R1 to transition point 112 and from the end of radius R2 to transition point 112. In other words, thickness T1 may be greater than thickness T2 and thickness T3 may be greater than thickness T2.

The taper from thickness T1 to transition point 112 may define a first tapered portion 126 of webbing 110. First tapered portion 126 may form an angle A1 relative to central axis 124. In some embodiments, angle A1 may be between about 4 degrees and about 6 degrees. In some embodiments, angle A1 may be about 5 degrees. The taper from thickness T3 to transition point 112 may define a second tapered portion 128 of webbing 110. Second tapered portion 128 may form an angle A2 relative to central axis 124. In some embodiments, angle A2 may be between about 5 degrees and about 7 degrees. In some embodiments, angle A2 may be about 6 degrees.

In some embodiments, thickness T1 may be between about 20 mm and about 26 mm, between about 22 mm and about 24 mm, or about 23 mm. In some embodiments, thickness T2 may be between about 15 mm and about 18 mm, or between about 16 mm and about 17 mm. In some embodiments, thickness T3 may be between about 20 mm and about 30 mm, between about 23 mm and about 27 mm, or about 25 mm.

The tapers from thickness T1 to transition point 112 and from thickness T3 to transition point 112 may further be defined in terms of ratios. For example, a ratio of thickness T1 to thickness T2 may be between about 1.1 and about 1.75. A ratio of thickness T3 to thickness T2 may be between about 1.33 and about 2.0. In some embodiments, the tapers from thickness T1 to transition point 112 and from thickness T3 to transition point 112 may be substantially linear. In other words, the thicknesses may vary in a substantially linear manner between thickness T1 and transition point 112 and between transition point 112 and thickness T3. Accordingly, the tapers from thickness T1 to transition point 112 and from thickness T3 to transition point 112 may be distinguishable from any change in thickness at radius R1 or radius R2, which may be non-linear.

The relationships between radii R1 and R2 and respective adjacent thicknesses may also be defined by ratios. For example, a ratio of radius R1 to adjacent thickness T1 may be between about 1.15 and about 2.13. A ratio of radius R2 to adjacent thickness T3 may be between about 0.5 and about 0.9.

Additional dimensions of webbing 110 may be understood with reference to distances D1, D2, D3, and D4, as shown in FIG. 3. Distance D1 may represent a distance from inner hub surface 116 to an end of radius R1. In some embodiments, distance D1 may be between about 30 mm and about 32 mm, or may be about 31 mm. Distance D2 may represent a distance from the end of radius R1 to transition point 112 and/or a length of first tapered portion 126. In some embodiments, distance D2 may be between about 45 mm and about 47 mm, or may be about 46 mm. Distance D3 may represent a distance from transition point 112 to the end of radius R2 and/or a length of second tapered portion 128. In some embodiments, distance D3 may be between about 50 mm and about 52 mm, or may be about 51 mm. Distance D4 may represent a distance from the end of radius R2 to inner rim surface 114. In some embodiments, distance D4 may be between about 17 mm and about 19 mm, or may be about 18 mm.

The particular dimensions and/or ranges of dimensions described herein may improve the strength of idler wheel 100 while under load and reduce the amount of material need to achieve such strength. Specifically, by controlling thicknesses T1, T2, and T3, radii R1 and R2, and distances D1, D2, D3, and D4 as described herein, idler wheel 100 may be suitably strong and durable while also achieving significant weight reduction as compared to previous idler wheel designs. Indeed, the dimensions described herein may provide idler wheel 100 with an unexpectedly enhanced strength-to-weight ratio.

Figure 4:
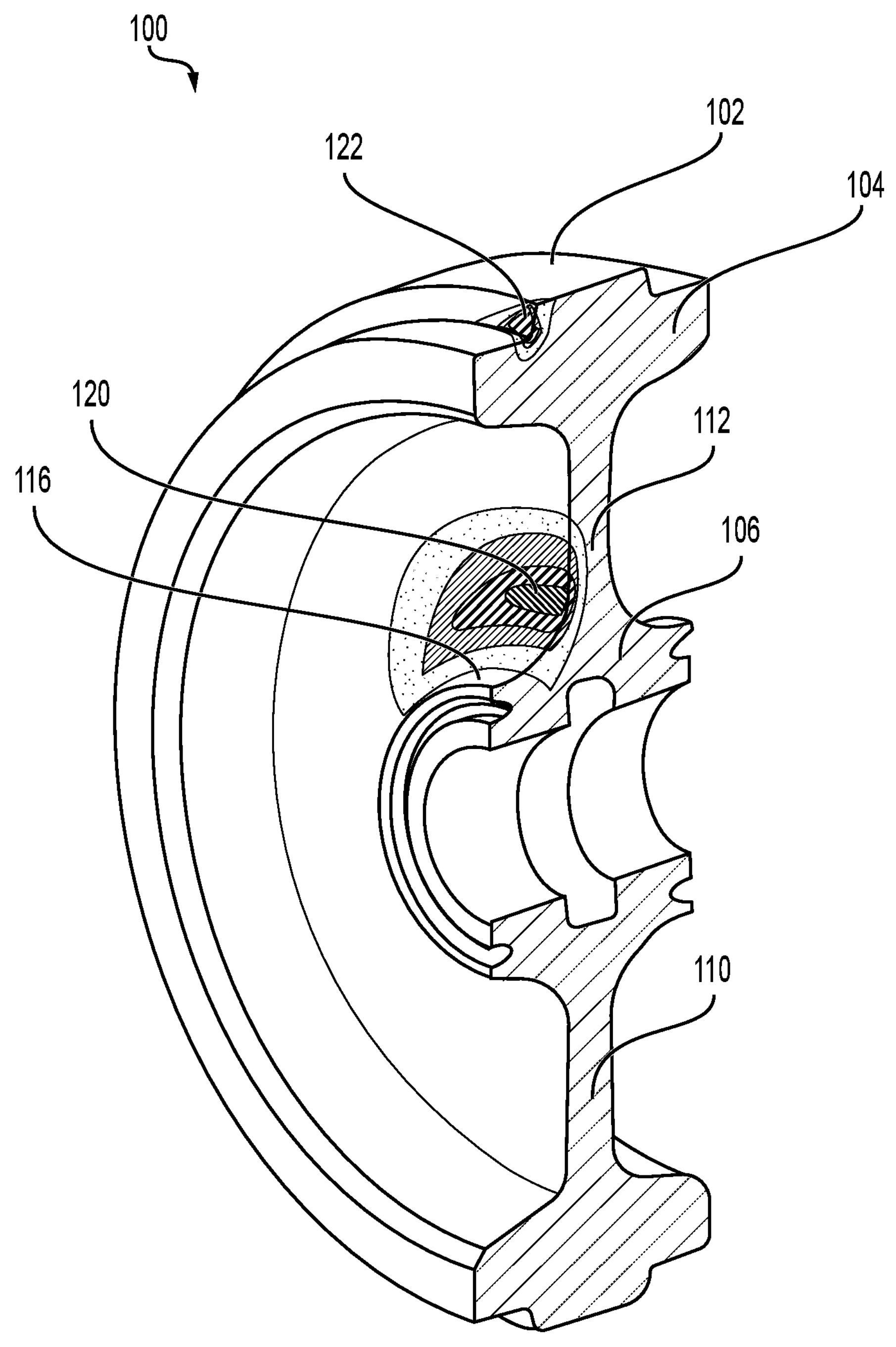
FIG. 4 is a perspective cross-sectional view of the exemplary idler wheel of FIG. 2A showing concentrations of stresses.

FIG. 4 illustrates a stress concentration mapping for idler wheel 100 when idler wheel 100 is subjected to ordinary loading. Though FIG. 4 depicts a cross-section of idler wheel 100, it will be understood that the stress concentration mapping represents stresses occurring when the entirety of idler wheel 100 is subject to loading. As shown, idler wheel 100 may experience concentrated stresses in stress concentration region 120 and stress concentration region 122 when subject to loading. Stress concentration region 120 may be located between transition point 112 and hub portion 106, where webbing 110 is fortified relative to transition point 112. Stress concentration region 122 may occur in rim portion 104, which may be significantly thicker than webbing 110. Besides stress concentration region 120 and stress concentration region 122, stresses may be well distributed throughout idler wheel 100, thereby helping to minimize a risk of failure due to stress and promoting an extended service life of idler wheel 100.

INDUSTRIAL APPLICABILITY

The disclosed aspects of idler wheel 100 may be used with a track assembly 12 and on any mobile machine that includes a tracked undercarriage. Idler wheel 100, as described herein, may provide a lightweight, durable, and cost-effective component of a tracked undercarriage, providing greater wear resistance, a longer service life, increased performance, reduced risk of deformation, and a lower likelihood of requiring maintenance or replacement. In the event replacement is needed, idler wheel 100 is optimized to use a minimal amount of material and therefore reduce replacement cost.

Previous idler wheels frequently included multiple separate components. For example, previously idler wheels may have incorporated separate hubs and rims, fixed together by plates welded thereto. Such a configuration suffered at least two disadvantages. First, welding together multiple components tended to increase assembly time and therefore cost. Second, the welds were primary points of failure, which required the idler wheels to be replaced at higher than desirable rates.

By contrast, idler wheel 100, as described herein, may eliminate a need for welds and/or to use multiple components. Moreover, a configuration of idler wheel 100 may allow for significantly reduced material usage in fabrication thereof, as opposed to a solid wheel of uniform thickness. Consequently, idler wheel 100 may be mass produced cost effectively, using a minimal amount of material, while also promoting reliability and service life of the component.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. An idler wheel, comprising:
an annular rim portion;
an annular hub portion configured to be positioned about an axle;
a webbing extending from a surface of the hub portion to a surface of the rim portion, the webbing including:
a first radius portion converging with the surface of the rim portion;
a second radius portion converging with the surface of the hub portion;
a taper transition point;
a first tapered portion between the first radius portion and the taper transition point, wherein the first tapered portion tapers in thickness from an end of the first radius portion to the taper transition point; and
a second tapered portion between the second radius portion and the taper transition point, wherein the second tapered portion tapers in thickness from an end of the second radius portion to the taper transition point;
wherein the first tapered portion and the second tapered portion each taper in an axial direction of the idler wheel towards the taper transition point to form a concave profile of the webbing between the hub portion and the rim portion.

2. The idler wheel of claim 1, wherein the first tapered portion has a first thickness at the end of the first radius portion and the taper transition point has a second thickness; and
wherein a ratio of the first thickness to the second thickness is between 1.1 and 1.75.

3. The idler wheel of claim 2, wherein the second tapered portion has a third thickness at the end of the second radius portion; and
wherein a ratio of the third thickness to the second thickness is between 1.33 and 2.0.

4. The idler wheel of claim 1, wherein the first tapered portion has a first thickness at the end of the first radius portion and the first radius portion has a first radius; and
wherein a ratio of the first thickness to the first radius is between 1.15 and 2.13.

5. The idler wheel of claim 1, wherein the second tapered portion has a third thickness at the end of the second radius portion and the second radius portion has a second radius; and wherein a ratio of the third thickness to the second radius is between 0.5 and 0.9.

6. The idler wheel of claim 1, wherein the first tapered portion has a first thickness at the end of the first radius portion between about 20 mm and about 26 mm and the taper transition point has a second thickness between about 15 mm and about 18 mm.

7. The idler wheel of claim 6, wherein the second tapered portion has a third thickness at the end of the second radius portion between about 20 mm and about 30 mm.

8. An idler wheel, comprising:

an annular rim portion;

an annular hub portion configured to be positioned about an axle;

a webbing extending from a surface of the hub portion to a surface of the rim portion, the webbing including:

a taper transition point between the surface of the hub portion and the surface of the rim portion;

a first tapered portion between the surface of the hub portion and the taper transition point, wherein the first tapered portion tapers substantially linearly in thickness toward to the taper transition point; and a second tapered portion between the surface of the rim portion and the taper transition point, wherein the second tapered portion tapers substantially linearly in thickness toward to the taper transition point;

wherein the first tapered portion and the second tapered portion each taper in an axial direction of the idler wheel towards the taper transition point to form a concave profile of the webbing between the hub portion and the rim portion.

9. The idler wheel of claim 8, wherein the first tapered portion is tapered at a first angle between about 4 degrees and about 6 degrees relative to a central axis of the webbing.

10. The idler wheel of claim 9, wherein the second tapered portion is tapered at a second angle between about 5 degrees and about 7 degrees relative to the central axis of the webbing.

11. The idler wheel of claim 9, wherein the taper transition point has a thickness between about 15 mm and about 18 mm.

12. The idler wheel of claim 11, wherein the first tapered portion tapers from a thickness between about 20 mm and about 26 mm to the thickness at the taper transition point.

13. The idler wheel of claim 8, wherein the first tapered portion is between about 45 mm and about 47 mm in length.

14. The idler wheel of claim 13, wherein the second tapered portion is between about 50 mm and about 52 mm in length.

15. An idler wheel, comprising:

an annular rim portion;

an annular hub portion configured to be positioned about an axle;

a webbing extending from a surface of the hub portion to a surface of the rim portion, the webbing including:

a first radius portion converging with the surface of the rim portion;

a second radius portion converging with the surface of the hub portion;

a first tapered portion extending a first length from an end of the first radius portion and tapering in thickness along the first length; and a second tapered portion extending a second length from an end of the second radius portion and tapering in thickness along the second length;

wherein the first tapered portion and the second tapered portion each taper in an axial direction of the idler wheel towards a taper transition point to form a concave profile of the webbing between the hub portion and the rim portion.

16. The idler wheel of claim 15, wherein the first length is between about 45 mm and about 47 mm.

17. The idler wheel of claim 16, wherein the second length is between about 50 mm and about 52 mm.

18. The idler wheel of claim 17, wherein the first radius portion has a first radius between about 30 mm and about 32 mm.

19. The idler wheel of claim 18, wherein the second radius portion has a second radius between about 16 mm and about 18 mm.

20. The idler wheel of claim 15, wherein the first tapered portion forms a first angle between about 4 degrees and about 6 degrees with a central axis of the webbing.

* * * * *